US012663279B1

(12) United States Patent
Maestas et al.

(10) Patent No.: US 12,663,279 B1
(45) Date of Patent: Jun. 23, 2026

(54) INTELLIGENT VEHICLE ROUTING FOR IMPROVED DRIVING SAFETY

(71) Applicant: UIPCO, LLC, San Antonio, TX (US)

(72) Inventors: Jerry John Maestas, Trophy Club, TX (US); Rory Scott Gossling, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 594 days.

(21) Appl. No.: 16/837,053

(22) Filed: Apr. 1, 2020

Related U.S. Application Data

(60) Provisional application No. 62/875,576, filed on Jul. 18, 2019.

(51) Int. Cl.
*G01C 21/34* (2006.01)
*G01S 19/42* (2010.01)

(52) U.S. Cl.
CPC ..... *G01C 21/3484* (2013.01); *G01C 21/3407* (2013.01); *G01S 19/42* (2013.01)

(58) Field of Classification Search
CPC .. G01C 21/3484; G01C 21/3407; G01S 19/42
See application file for complete search history.

(56) References Cited

U.S. PATENT DOCUMENTS

| | | | |
|---|---|---|---|
| 2011/0160964 A1* | 6/2011 | Obradovich | ............ H04L 43/08 |
| | | | 701/41 |
| 2018/0118219 A1* | 5/2018 | Hiei | ...................... B60W 50/14 |
| 2018/0164108 A1* | 6/2018 | Rahal-Arabi | ...... G01C 21/3484 |
| 2019/0049957 A1* | 2/2019 | Healey | ................... B60W 40/08 |
| 2019/0213429 A1* | 7/2019 | Sicconi | ................... G06F 3/167 |
| 2022/0034678 A1* | 2/2022 | Chintakindi | ...... B60W 60/0051 |

* cited by examiner

*Primary Examiner* — James M Mcpherson
*Assistant Examiner* — Bakari Underwood
(74) *Attorney, Agent, or Firm* — Plumsea Law Group, LLC

(57) ABSTRACT

A method of intelligently routing vehicles to improve driving safety is disclosed. The method includes monitoring biometric information to learn when a driver may be stressed in response to an external condition. The method further includes generating routes for the driver that avoid, or limit, the driver's exposure to the external condition. The learning can occur over a sequence of distinct trips, or in real time on a single trip.

12 Claims, 11 Drawing Sheets

INTELLIGENT VEHICLE ROUTING FOR IMPROVED DRIVING SAFETY

CROSS-REFERENCE TO RELATED APPLICATIONS

This application claims the benefit of U.S. Provisional Patent Application Ser. No. 62/875,576, filed Jul. 18, 2019, for "Intelligent Vehicle Routing for Improved Driving Safety", the entirety of which is hereby incorporated by reference.

TECHNICAL FIELD

The present disclosure generally relates to intelligent routing, and specifically to a method for routing vehicles to improve driving safety.

BACKGROUND

Defensive driving skills help drivers reduce the risk of collisions by anticipating dangerous situations that may occur while driving, even when the driver is operating the vehicle in a technically sound manner. One aspect of defensive driving may include ensuring that the driver's stress levels are minimized during a trip, since increased stress can be distracting and lead to mistakes. Driver stress levels may in turn depend on external conditions of a route. Moreover, the amount of stress caused by a given external condition may vary from driver to driver. Currently, vehicle navigation systems generate routes by minimizing overall driving time. Conventional route selection algorithms fail to consider factors related to safety, including the stress that might be caused by having the driver travel along a particular route.

There is a need in the art for a system and method that addresses the shortcomings discussed above.

SUMMARY

In one aspect, a method of providing a driving route for a vehicle includes steps of: receiving information about an external condition associated with an environment of the vehicle, receiving a current location of the vehicle, receiving feedback about a driver of the vehicle, using the feedback to determine if the driver is in a controlled state, storing information about the external condition and the current location when the driver is not in the controlled state, receiving a starting location and an ending location, determining a route between the starting location and the ending location based on the stored current location and stored external condition, and presenting the route to the driver.

In another aspect, a method of providing a driving route for a vehicle includes steps of receiving information about an external condition associated with an environment of the vehicle, receiving a current location of the vehicle, receiving feedback about a driver of the vehicle, using the feedback to determine if the driver is in a controlled state, and storing information about the external condition and the current location when the driver is not in the controlled state. The method also includes steps of receiving a starting location and an ending location, determining a first route between the starting location and the ending location, the first route being associated with a first predicted driving time, determining a second route between the starting location and the ending location based on the stored current location and stored external condition, the second route being associated with a second predicted driving time, comparing the first predicted driving time and the second predicted driving time, selecting the second route when the difference between the second predicted driving time and the first predicted driving time is less than a threshold driving time, and otherwise selecting the first route.

In another aspect, a method of providing and modifying a driving route for a vehicle includes steps of receiving a starting location and an ending location, determining a route between the starting location and the ending location and presenting the route to a driver of the vehicle, receiving information about an external condition associated with an environment of the vehicle, receiving feedback about a driver of the vehicle, learning that the external condition increases stress in the driver, receiving a current location, identifying at least one location along the route between the current location and the ending location where the driver will be exposed to the external condition, determining a modified route between the current location and the ending location that avoids exposing the driver to the at least one location, and presenting the modified route to the driver.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

The embodiments provide a method and system to improve driving safety. Specifically, the method and system enable intelligent routing for a vehicle based on not only transit time, but also factors including driver stress levels. The vehicle can include a driver monitoring system that monitors biometric and/or autonomic information to determine if a driver is stressed and/or in a controlled state. Moreover, the driving environment can also be monitored to identify any external conditions that may be causing the driver stress. Examples of external conditions that may invoke stress in some drivers include left-hand turns, roundabouts, and merging lanes. Over time, the system can learn which external conditions (and/or the locations where the external conditions are present) may lead a driver to be stressed. When determining a new route, the system may select a route that limits or avoids the stress-inducing external conditions.

By selecting routes that avoid, or limit, exposing a driver to stressful external conditions, the system and method facilitate increased driving safety. This helps reduce or eliminate stresses that can lead a driver to be distracted, or to make unsafe decisions. The present system and methods may therefore be seen as facilitating defensive driving.

Figure 1:
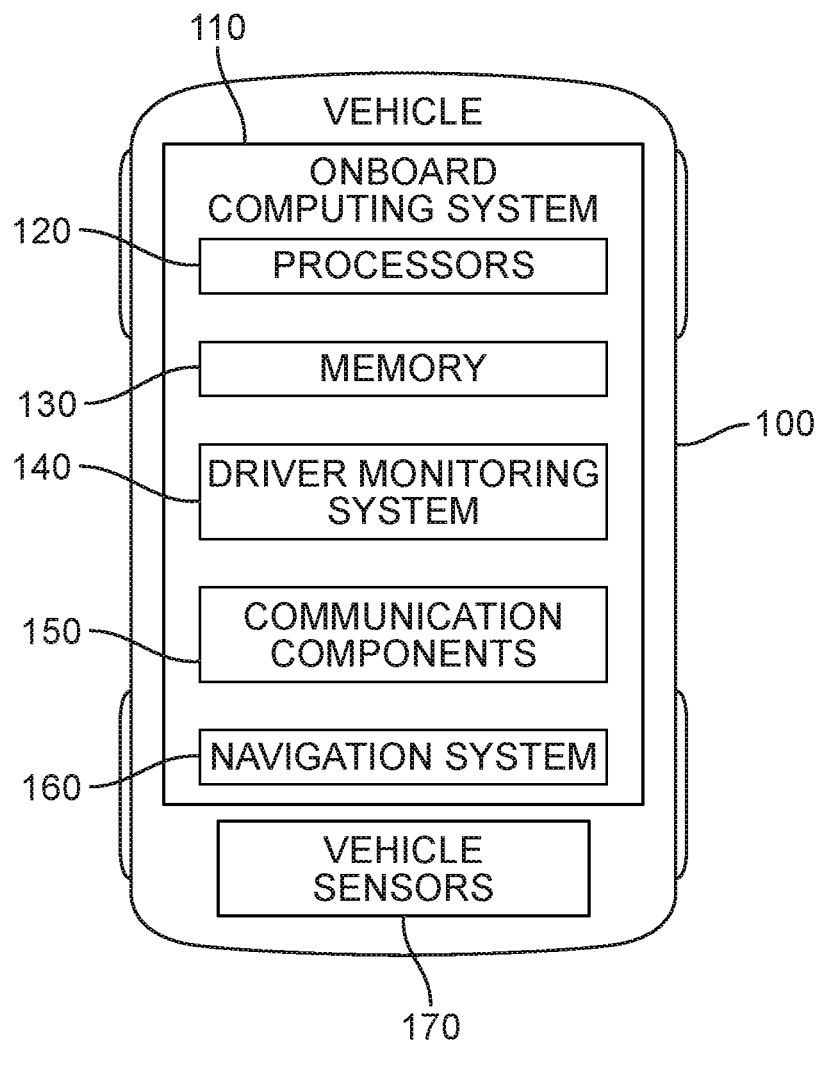
FIG. 1 is a schematic view of a motor vehicle, according to an embodiment.

FIG. 1 is a schematic view of a motor vehicle 100, or simply vehicle 100. Vehicle 100 may include an onboard computing system 110. Onboard computing system 110 may comprise a single computing device, or a network of multiple computing devices. Onboard computing system 110 could be associated with one or more electronic control units (ECUs). As seen in FIG. 1, onboard computing system 110 includes one or more processors 120 and memory 130. Memory 130 may comprise a non-transitory computer readable medium. Instructions stored within memory 130 may be executed by the one or more processors 120.

For clarity, some of the vehicle systems of the embodiments are depicted as residing within a single onboard computing system 110. However, it may be appreciated that in some embodiments, one or more of these systems could be separate and may not comprise part of a single computing system. Instead, two or more systems could each comprise their own processors and/or memory, as well as components facilitating communication with other systems.

Vehicle 100 may also include one or more communication components 150. Communication components 150 may include cellular network components for communicating over cellular networks, Wi-Fi components for communicating over Wi-Fi networks, and other communication components.

Vehicle 100 may also include a navigation system 160. In some cases, navigation system 160 includes a GPS receiver that can receive GPS information. In other cases, navigation system 160 can include other receivers capable of receiving global or local positioning information. Additionally, navigation system 160 may comprise maps and/or information from other kinds of geographic information systems (GIS) that can be used to generate navigation routes for a driver.

Vehicle 100 may also include one or more vehicle sensors 170. Vehicle 100 may also include an onboard diagnostics (OBD) system, which is not shown for clarity. An OBD system may track and process various vehicle sensor information. In some cases, one or more systems of vehicle 100 could retrieve sensory data from the OBD system rather than directly from the sensors themselves.

As seen in FIG. 1, vehicle 100 may include a driver monitoring system 140. Driver monitoring system 140 may be configured to monitor a driver's behavior and/or physical state, as described in further detail below and shown schematically in FIG. 4.

Figure 2:
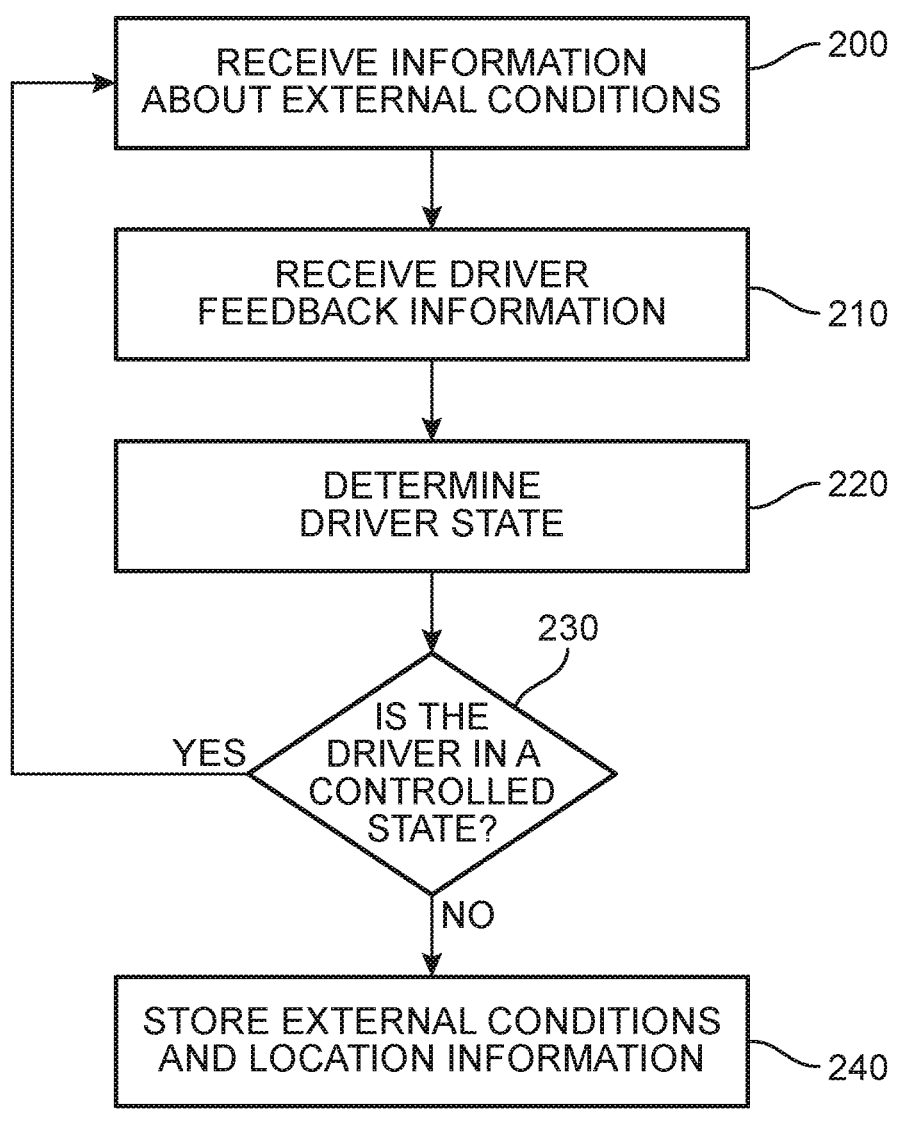
FIG. 2 is a schematic process for storing information when a driver is not in a controlled state, according to an embodiment.

FIG. 2 is a schematic view of a process for detecting information about a driver and external conditions, and storing that information for use in learning how to facilitate defensive driving. It may be appreciated that one or more of these steps may be performed by an onboard computing system, such as onboard computing system 110, also referred to simply as system 110.

Figure 3:
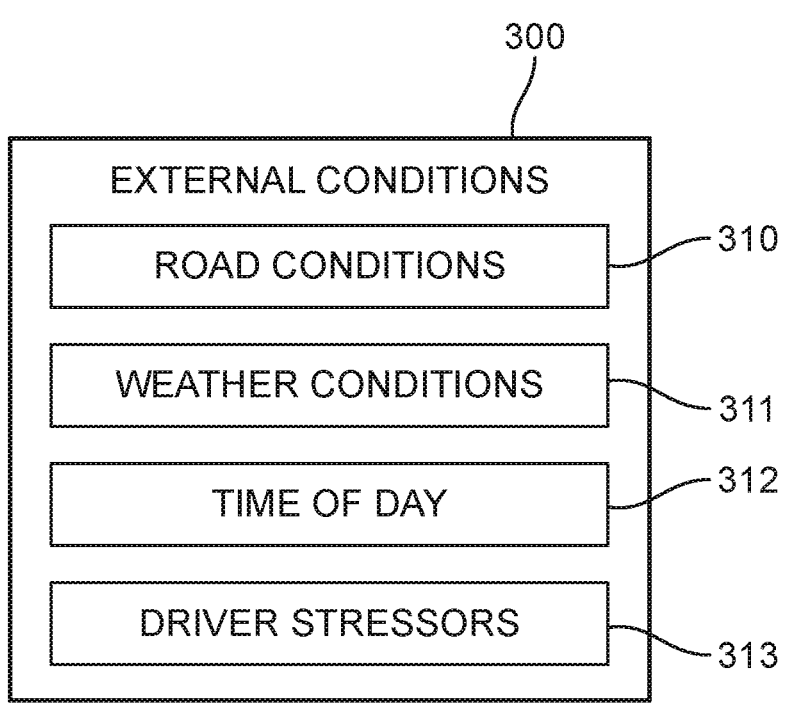
FIG. 3 is a schematic view of a set of external conditions that may be considered in the process of FIG. 2, according to one embodiment.

In step 200, system 110 may receive information about external conditions to a vehicle. As shown in FIG. 3, external conditions 300 may include, but are not limited to: road conditions 310, weather conditions 311, time of day 312, and driver stressors 313. Road conditions 310 may include information about the condition of the current road and/or adjacent roadways. These may include current traffic patterns, physical road conditions (e.g., potholes), the type of roadway (for example, a neighborhood street, a highway, etc.), the presence of a stop sign, the presence of a stoplight, the presence of a one-way sign, the presence of traffic cones or other barriers, the number of lanes, as well as possibly other roadway condition information. Weather conditions 311 could include, for instance, whether it is dry, raining, windy, snowing, and/or if the roads are wet, dry or icy. Time of day 312 can include an explicit time (for example, 3 pm), or a general timeframe such as morning, afternoon, evening and/or late-night. Time of day 312 may also explicitly or implicitly include information about lighting conditions. For example, if the time of day 312 is 9 pm, the system can infer that it is dark outside. In other embodiments, a system could monitor ambient lighting conditions directly using one or more ambient lighting sensors.

Driver stressors 313 may include features of the current road or nearby roads that are known to stress the particular driver of the vehicle, or which are commonly associated with driver stress. For example, one driver stressor may be a specific left hand turn at a given intersection. Another driver stressor may be single lane roads that require a driver to enter the oncoming traffic lane to pass other vehicles. Another driver stressor may be merging lanes. Another driver stressor may be highways with large speed limits. Another driver stressor may be crossing bridges. Another driver stressor may be driving in downtown areas. Another driver stressor may be driving near drivers that are behaving erratically. Another driver stressor may be heavy traffic congestion and/or vehicles pulled over on the side of a major roadway. Another driver stressor may be passing the location where the driver has previously been involved in an accident.

Returning to the process of FIG. 2, in step 210, system 110 may receive driver feedback information. Driver feedback information may be determined by driver monitoring system 140. The feedback can include various kinds of biometric information or other information about a driver's physical state. The feedback can also include information about the driver's behavior (for example, movements) that may be determined using information from one or more vehicle systems.

In step 220, system 110 may determine the driver's state. Here, the term "driver state" may refer to whether the driver is in a "controlled" or "uncontrolled" state with respect to their operation of the vehicle. Alternatively, the driver state could be characterized as being in a safe or unsafe state with respect to operation of the vehicle.

In some cases, a highly stressed driver may not be in a controlled state. Thus, in some embodiments, step 220 includes analyzing driver feedback information in the form of stress indicating biometric and/or autonomic information. Such information could include perspiration levels, heart rate, as well as other information. A driver may also not be in a controlled state if he or she is incapacitated, drowsy, intoxicated, or otherwise unable to perform one or more driving activities in a safe manner.

In step 230, system 110 checks if the driver is in a controlled state. If so, the system returns to step 200 to monitor external conditions. Otherwise, system 110 proceeds to step 240 to store external conditions and location information. For example, if the system determines that the driver is not in a controlled state (in step 230) and that they are currently merging onto a highway (as determined in step 200), the system may store the external conditions and the current location of the vehicle. This allows the system to identify, at a later time, when a given route passes through or near a roadway where there are external conditions that cause the driver substantial stress. As described in further detail below, this information can be used by the system to route the driver around the external conditions associated with increased driver stress.

The process described in FIG. 2 may be used to help a system learn which external conditions are associated with an uncontrolled state, such as a highly stressed state. In some cases, the system may simply store the location where one or more external conditions appear to cause the driver stress. When future routes are considered, such a location could be bypassed to keep the driver's stress low during the trip. In other cases, the system may learn to identify external conditions that can be generalized to other locations. For example, if the system learns that a driver is stressed when traveling through roundabouts at two or more locations, the system may conclude that the driver may generally be stressed by traveling through any roundabouts. When future routes are considered, the system could select routes that reduce the number of roundabouts along the trip, and/or completely eliminate roundabouts from the trip. As another example, if the system learns that a driver is stressed when driving in icy road conditions, the system could ensure future routes avoid, or limit, exposure to icy road conditions by considering weather information associated with different points along the route.

The data gathered during the process shown in FIG. 2, including external conditions and location information associated with driver's being in an uncontrolled state (for example, a highly stressed state), could be fed into a machine learning algorithm. The machine learning algorithm could be used to facilitate learning patterns in external conditions that cause stress or otherwise cause a driver to be in an uncontrolled state. Examples of machine learning algorithms that could be used include, but are not limited to: supervised learning algorithms, unsupervised learning algorithms, and reinforcement learning algorithms.

Figure 4:
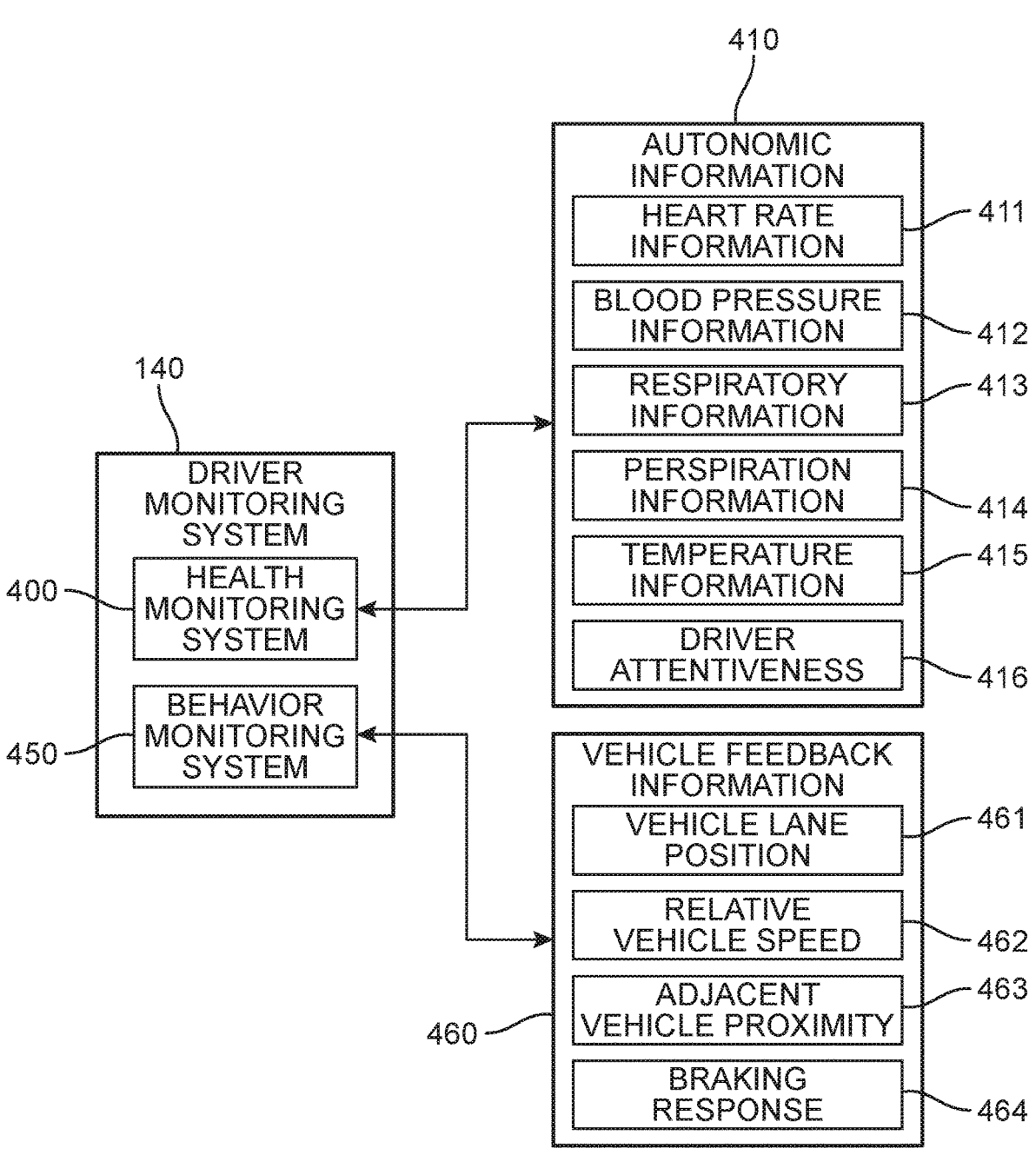
FIG. 4 is a schematic view of a driver monitoring system and associated information that may be used by the driver monitoring system, according to an embodiment.

Referring now to FIG. 4, driver monitoring system 140 can further include a health monitoring system 400 and a behavior monitoring system 450. Health monitoring system 400 may include a system that monitors a driver's physical state. Health monitoring system 400 may be capable of sensing autonomic information 410 for a driver (that is, information related to the driver's autonomic nervous system). Autonomic information 410 can include heart rate information 411, blood pressure information 412, respiratory information 413, perspiration information 414, temperature information 415, and driver attentiveness 416. Behavior monitoring system 450 may also infer driving behavior from vehicle feedback information 460. Examples of vehicle feedback information include, but are not limited to: vehicle lane position 461, relative vehicle speed 462, adjacent vehicle proximity 463, and braking response 464.

Figure 5:
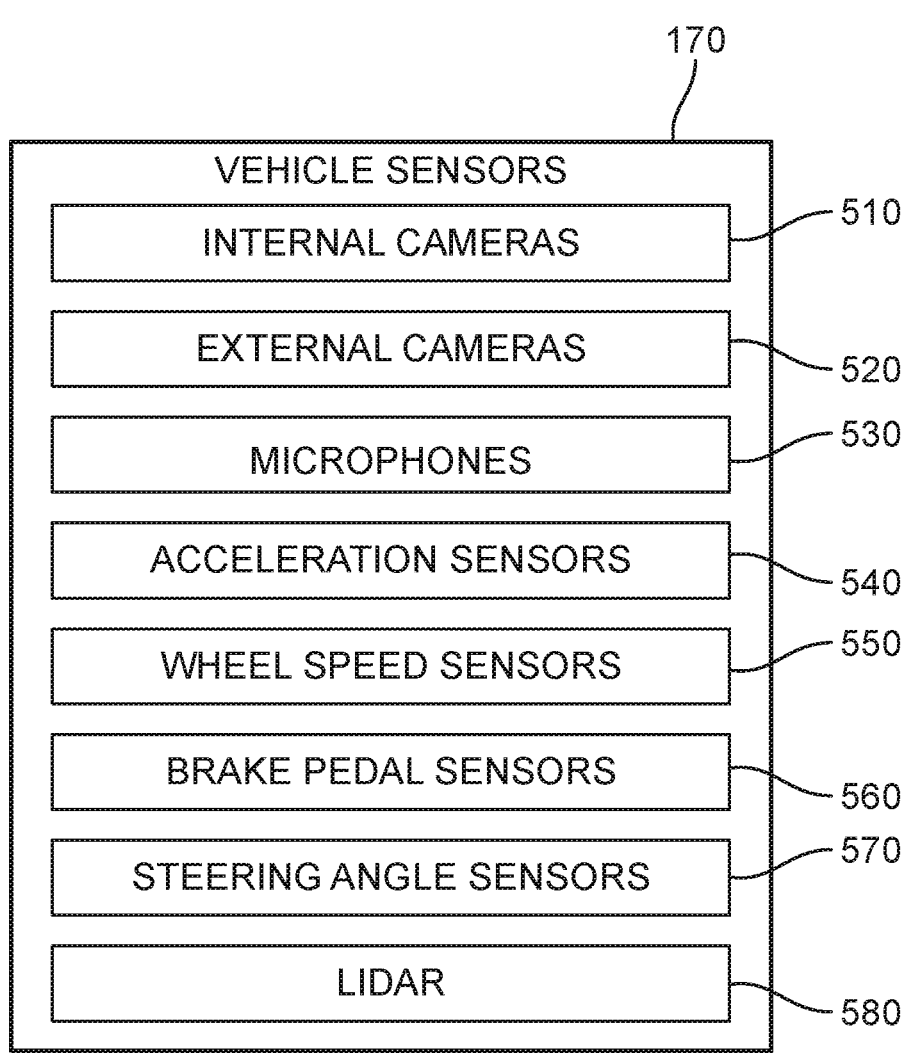
FIG. 5 is a schematic view of a set of vehicle sensors, according to an embodiment.

Vehicle feedback information can be received from one or more sensors including various sensors depicted in FIG. 5. These include, but are not limited to, internal cameras 510, external cameras 520, microphones 530, acceleration sensors 540 (for example, an acceleration pedal sensor), wheel speed sensors 550, brake pedal sensors 560, and steering angle sensors 570. Additionally, vehicle feedback information (for example, adjacent vehicle proximity) could be determined from a light detection and ranging system 580 (LIDAR) and/or RADAR based sensors.

Figure 6:
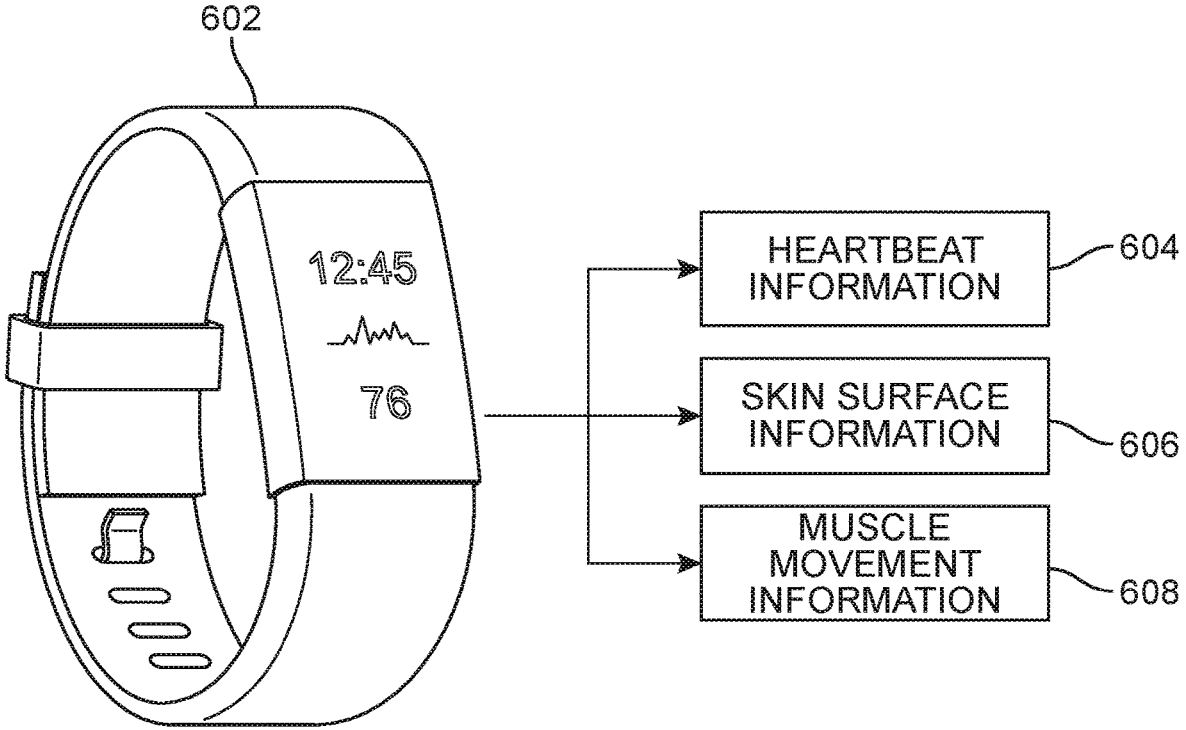
FIG. 6 is a schematic view of a device for monitoring biometric information.

Autonomic information can be detected using a variety of different sensors, including various kinds of biometric sensors. FIG. 6 is an example of one device that may be used to sense autonomic information. In this example, a health monitoring device 602 takes the form of a smart watch with built in biometric sensors. However, in other embodiments, biometric sensors could be provided as part of another kind of device that is worn by, or disposed adjacent to, a user. Health monitoring device 602 includes one or more sensors that can be used for detecting heartbeat (or heart rate) information 604, skin surface information 606 (such as sweat levels and temperature) and/or muscle movement information 608.

Figure 7:
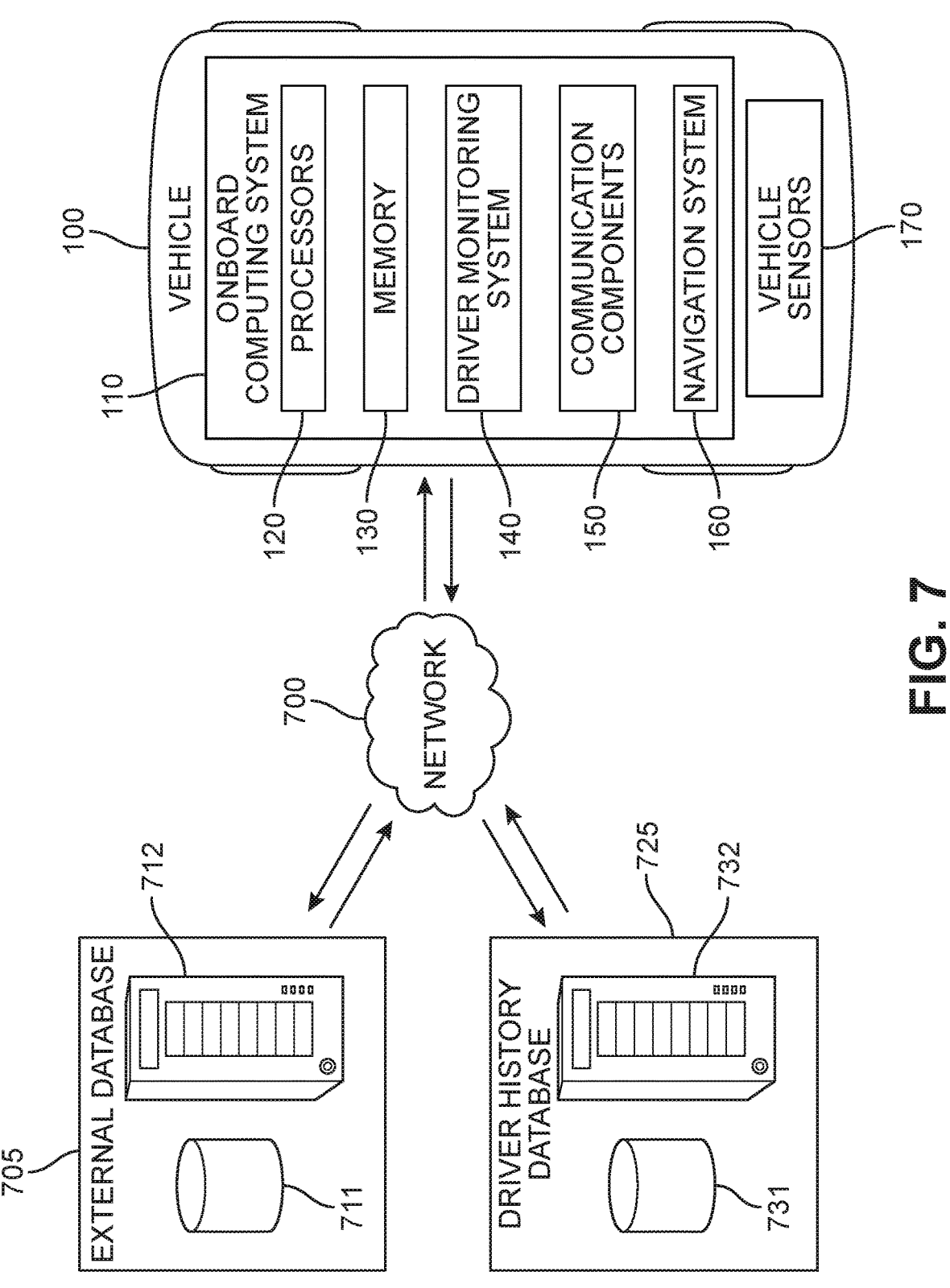
FIG. 7 is a schematic view of a motor vehicle in communication with two different database systems, according to an embodiment.

FIG. 7 is a schematic view of an exemplary configuration where onboard computing system 110 of vehicle 100 may communicate with one or more remote systems over a network 700. Network 700 could comprise any wide area network, local area network or other suitable network. In some cases, network 700 may be the Internet. System 110 may communicate, for example, with an external database system 705. External database system 705 can include a server 712 (including processors and memory) and a database 711. External database system 705 may store various kinds of information, including, but not limited to: navigation information, geospatial information, road conditions (for example, real-time traffic patterns), weather information (including, for example, rain, snow, ice and/or flooding forecasts), as well as other kinds of information.

System 110 may also communicate, for example, with a driver history database system 725. Driver history database system 725 can include a server 732 (including processors and memory) and a database 731. Driver history database system 725 may store various information related to historical driving information. This may include information about driver stressors. For example, information indicating that a driver is stressed by merging onto highways or driving in icy road conditions could be stored at, and retrieved from, driver history database system 725.

It may be appreciated that system 110 may both send and receive information to and from these remote databases. Moreover, it may also be appreciated that in other embodiments, one or more of these databases (or parts of the databases) could be locally disposed within vehicle 100.

FIGS. 8-11 are intended to illustrate several exemplary scenarios where a driver may be re-routed when a system has determined that particular scenarios increase stress in a driver. It may be appreciated that these exemplary scenarios are not intended to be limiting, and the principles described above may be applied to a wide range of different driving scenarios.

Figure 8:
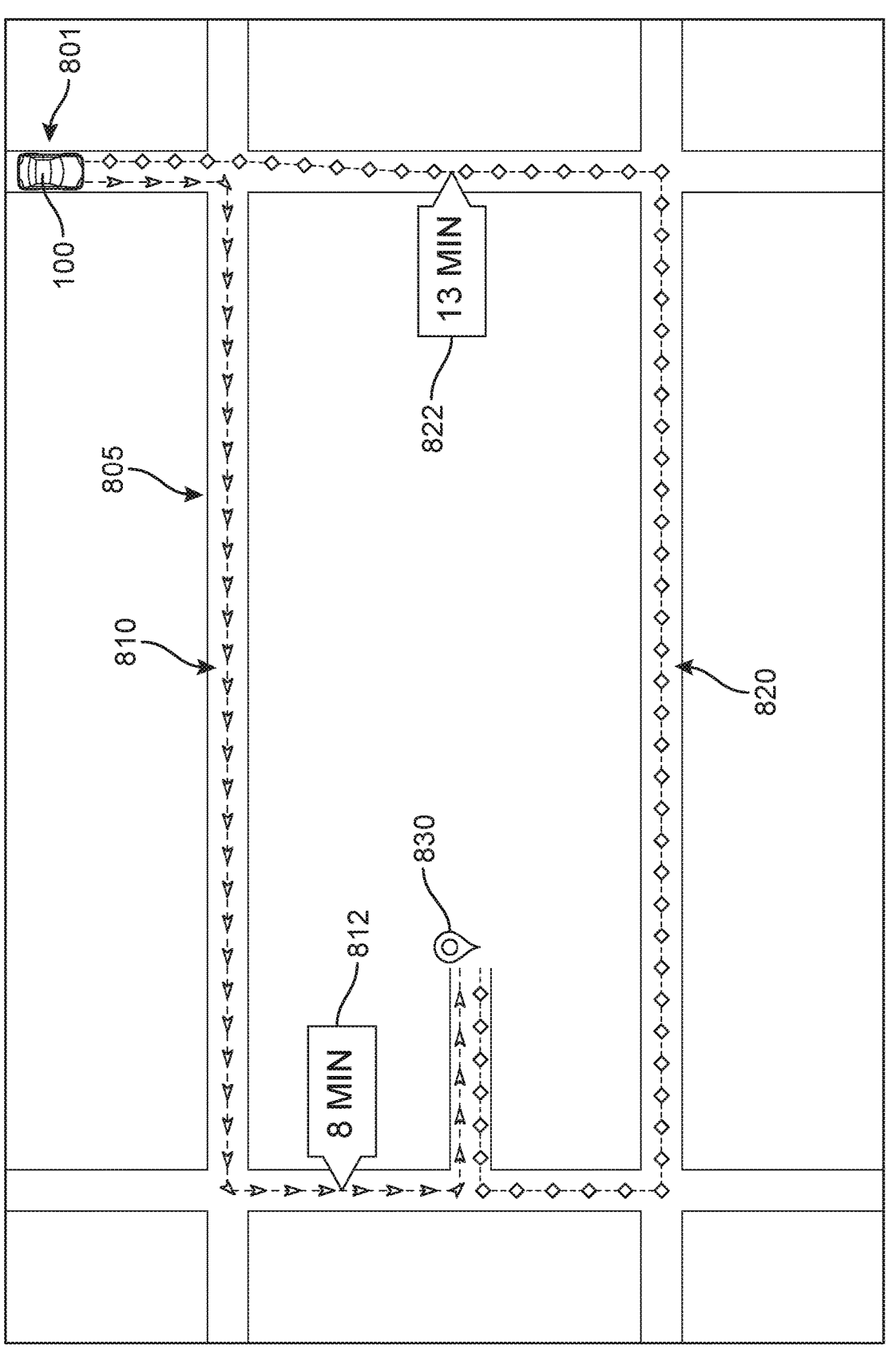
FIG. 8 is a schematic view of a scenario where a vehicle may be intelligently routed to avoid left turns, according to an embodiment.

In a first exemplary scenario, depicted schematically in FIG. 8, the driver of vehicle 100 is presented with one or more possible driving routes between starting location 801 and ending location 830. In this example, a driver may be presented with different routes based on stress caused by making left hand turns. Here, roadways 805 may represent multi-lane roads, including large highways with 4-6 lanes at each intersection. In such scenarios, a driver may find it stressful to make turns while faced with oncoming traffic, or may find it stressful to navigate to the far left in order to make the turn.

As seen in FIG. 8, in one situation, vehicle 100 is routed from starting location 801 to ending location (or destination) 830 along a first route 810. However, while traveling on first route 810 the driver monitoring system 140 (see FIG. 7) detects increased stress levels when the driver is making left hand turns. Because of these stress levels, at a later time vehicle 100 may be routed along a second route 820 that differs from first route 810. Second route 820 has a longer driving time 822 of 13 minutes (compared to 8 minutes for the driving time 812 first route 810). But second route 820 is selected for the driver because the driver does not have to make any left turns in traveling from current location 801 to ending location 830.

Figure 9:
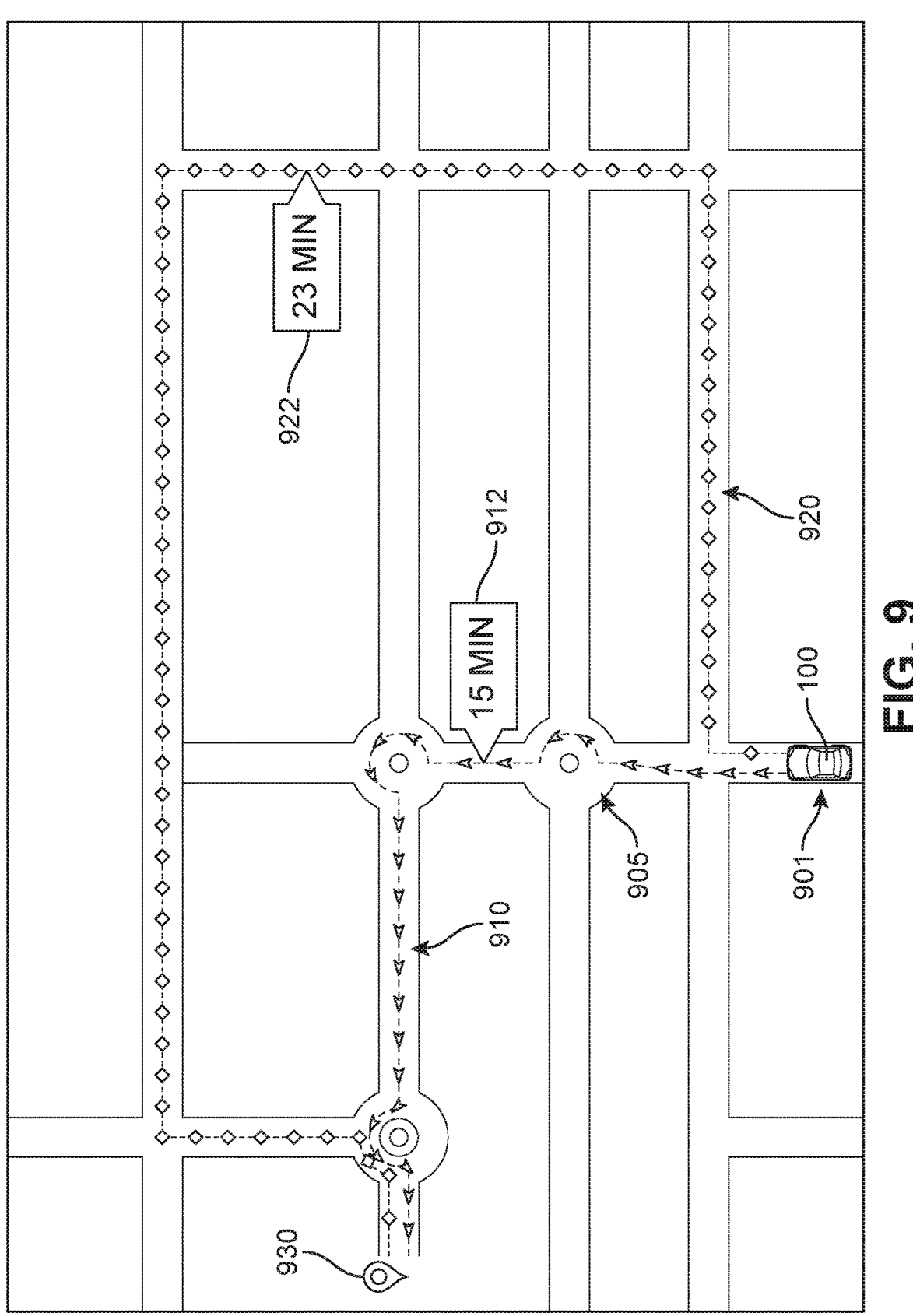
FIG. 9 is a schematic view of a scenario where a vehicle may be intelligently routed to avoid roundabouts, according to an embodiment.

In a second exemplary scenario, depicted schematically in FIG. 9, the driver of vehicle 100 is presented with one or more possible driving routes between starting location 901 and ending location 930. In this example, a driver may be presented with different routes based on stress caused by traveling through roundabouts.

As seen in FIG. 9, in one situation, vehicle 100 is routed from starting location 901 to ending location (or destination) 930 along a first route 910. However, while traveling on first route 910 the driver monitoring system 140 (see FIG. 7) detects increased stress levels when the driver is traveling through one or more of the roundabouts 905. Because of these stress levels, at a later time vehicle 100 may be routed along a second route 920 that differs from first route 910. Second route 920 has a longer driving time 922 of 23 minutes (compared to 15 minutes for the driving time 912 first route 910). But second route 920 is selected for the driver because the driver does not have to pass through all of the roundabouts in traveling from starting location 901 to ending location 930. Instead, when traveling on second route 920, the driver is only required to travel through a single roundabout near ending location 930.

Figure 10:
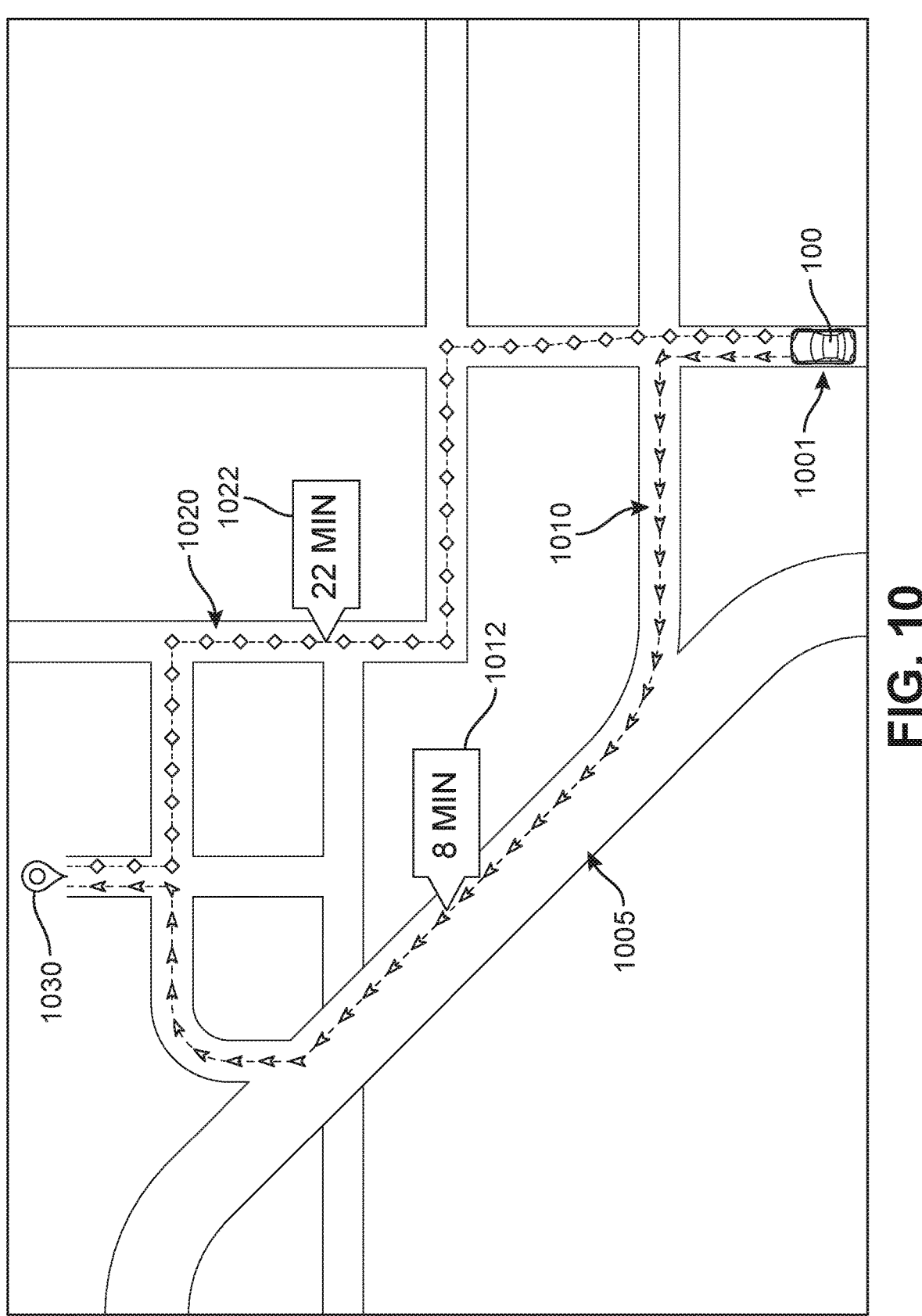
FIG. 10 is a schematic view of a scenario where a vehicle may be intelligently routed to avoid merging onto a highway, according to an embodiment.

In a third exemplary scenario, depicted schematically in FIG. 10, the driver of vehicle 100 is presented with one or more possible driving routes between starting location 1001 and ending location 1030. In this example, a driver may be presented with different routes based on stress caused by merging onto a highway 1005.

As seen in FIG. 10, in one situation, vehicle 100 is routed from starting location 1001 to ending location (or destination) 1030 along a first route 1010. However, while traveling on first route 1010 the driver monitoring system 140 (see FIG. 7) detects increased stress levels when the driver is merging onto highway 1005. Because of these stress levels, at a later time vehicle 100 may be routed along a second route 1020 that differs from first route 1010. Second route 1020 has a longer driving time 1022 of 22 minutes (compared to 8 minutes for the driving time 1012 first route 1010). But second route 1020 is selected for the driver because the driver does not have to merge onto a highway and instead can travel on local streets where the speed limit is substantially lower than on the highway.

A system may be configured to balance preferences for shorter trip times with the desire to limit exposing the driver to stressful external conditions. In some cases, a system could compare a route generated to reduce stress with another route generated to limit driving time. The system may select the route that reduces stress unless the predicted driving time of that route is substantially greater than the predicted driving time for the route that minimizes travel time. In some cases, the system can use a threshold driving time to determine when one route is substantially longer than another. The threshold driving time could be an absolute driving time or a percentage of either the shortest time route or the least stressful route.

Figure 11:
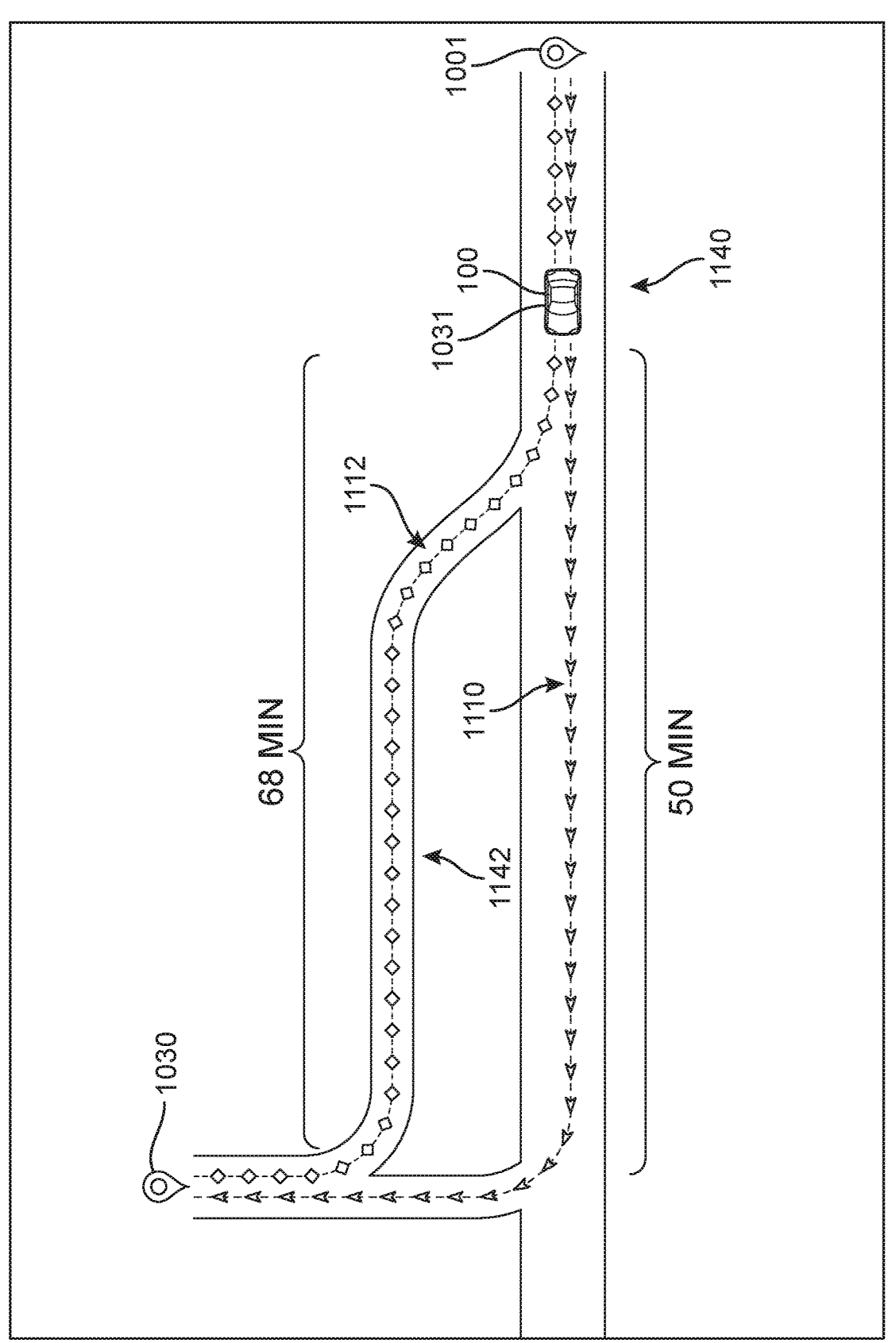
FIG. 11 is a schematic view of a scenario where a vehicle may be intelligently re-routed during a trip to avoid highway driving, according to an embodiment.

In some embodiments, a system could change the current route to a modified route before the vehicle reaches the ending location, based on stresses detected during the driver. For example, FIG. 11 depicts a schematic scenario where a vehicle 100 is already traveling along a first route 1110 between a starting location 1001 and an ending location 1030. First route 1110 is along a highway 1140. During the trip, the driver monitoring system 140 detects that the driver is stressed out by driving at high speeds on highway 1140. In response, the system automatically generates a modified route 1112 that passes along a service road 1142 adjacent to highway 1140. Specifically, the modified route 1112 begins at a current location 1031 and ends at ending location 1030. As seen in FIG. 11, the remaining driving time along first route 1110 is 50 minutes, while the predicted driving time to travel along modified route 1112 is 68 minutes. Although the remainder of the trip time is slightly longer for modified route 1112, the system presents the modified route to the user to reduce the stress associated with driving at high speeds.

In some cases, rather than re-route a driver, a system may take actions that help reduce the stress associated with an external condition known to cause stress. For example, if a system knows a driver is stressed when passing vehicles pulled over on the side of the road, the system could take action without deviating from the current route. In some cases, upon detecting, or otherwise receiving information about the presence of a vehicle pulled over further down the road, the system could indicate that the driver should change lanes.

The embodiments make use of one or more motor vehicles. As used herein, the term "motor vehicle," or simply vehicle, refers to any kind of car, van, truck, motorcycle, or similar motorized vehicle. A motor vehicle can be powered using an internal combustion engine, an electric motor, a hybrid of an internal combustion engine and an electric motor, as well as any other suitable power source. A motor vehicle may further include wheels that are powered by the engine or motor and components for controlling the vehicle (for example, pedals and a steering wheel).

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of providing a driving route for a vehicle, comprising:

receiving at a computing system information from at least one source about an external condition associated with an environment outside of the vehicle, a current location of the vehicle, and feedback from at least one of sensors and a driver monitoring system in the vehicle about a driver of the vehicle;

using the feedback in the computing system to determine when the driver is in a controlled state and not stressed;

storing information about the external condition and the current location associated with the driver being stressed;

using the information about the external conditions and the current location in a machine learning algorithm to learn patterns in external conditions that cause the driver to be in an uncontrolled state, stressed, and otherwise unable to perform one or more driving activities in a safe manner;

receiving at the computing system a starting location and an ending location;

determining using the computing system a route between the starting location and the ending location based on the stored current location, the stored external condition, and the learned patterns in external conditions to limit exposing the driver to external conditions along the route associated with the driver being stressed;

presenting the route to the driver through the navigation system disposed in the vehicle and in communication with the computing system to be followed by the driver in driving from the starting location to the ending location; and presenting instructions to the driver through the navigation system disposed in the vehicle in real time while the driver is traveling along the presented route that indicate actions for the driver to take that do not cause the driver to deviate from the presented route while reducing stress in the driver based on the learned patterns in external conditions by modifying a position of the vehicle on a road along the presented route to avoid conditions detected in real time by the computing system along the presented route that cause the driver to be in the uncontrolled state and stressed.

2. The method according to claim 1, wherein receiving the current location of the vehicle includes receiving GPS information.

3. The method according to claim 1, wherein receiving feedback about the driver of the vehicle includes receiving autonomic information from a sensor.

4. The method according to claim 3, wherein the autonomic information is used to determine when the driver is in an increased state of stress.

5. The method according to claim 1, wherein the step of receiving the starting location and the ending location occurs at a later time than the step of storing information.

6. The method according to claim 1, wherein the method further includes learning that the external condition induces stress in the driver.

7. A method of providing a driving route for a vehicle, comprising:

receiving at a computing system information from at least one source about an external condition associated with an environment of the vehicle, a current location of the vehicle, and feedback about a driver of the vehicle from a driver monitoring system in the vehicle;

using the feedback in the computing system to determine a driver state;

storing information about the external condition and the current location when the driver is not in a controlled state and is stressed;

using the information about the external conditions and the current location in a machine learning algorithm to learn patterns in external conditions that cause the driver to be stressed;

determining using the computing system a route between a starting location and an ending location based on the stored current location, the stored external condition, and the learned patterns in external conditions to limit exposing the driver to external conditions along the route associated with the driver being stressed;

presenting the route to the driver through a navigation system disposed in the vehicle in communication with the computing system; and presenting instructions to the driver through the navigation system disposed in the vehicle in real time while the driver is traveling along the presented route that indicate actions for the driver to take that do not cause the driver to deviate from the presented route while reducing stress in the driver based on the learned patterns in external conditions by modifying a position of the vehicle on a road along the presented route to avoid conditions detected in real time by the computing system along the presented route that cause the driver to be in the uncontrolled state and stressed.

8. The method according to claim 7, wherein the driver monitoring system comprises a health monitoring system and a behavior monitoring system.

9. The method according to claim 8, wherein receiving feedback about the driver of the vehicle from the driver monitoring system comprises receiving autonomic information from biometric sensors in the health monitoring system.

10. The method according to claim 8, wherein receiving feedback about the driver of the vehicle from a driver monitoring system comprises receiving information about driver behavior from sensors in the behavior monitoring system.

11. The method according to claim 7, wherein receiving information about an external condition comprises receiving information about driver stressors that are known to stress the driver.

12. The method according to claim 7, wherein method further comprises:

feeding the stored external condition and current location into a machine learning algorithm; and using the machine learning algorithm to facilitate learning patterns in external conditions that cause the driver to be in an uncontrolled state.

* * * * *